United States Patent [19]

Atwood

[11] 4,333,207

[45] Jun. 8, 1982

[54] TWIN WHEEL CASTER BRAKE

[75] Inventor: John T. Atwood, South Bend, Ind.

[73] Assignee: Shepherd Products U.S. Inc., St. Joseph, Mich.

[21] Appl. No.: 219,363

[22] Filed: Dec. 22, 1980

[51] Int. Cl.³ .............................................. B06B 33/00
[52] U.S. Cl. .................................... 16/35 R; 188/1.12
[58] Field of Search .................... 16/35 R, 47, 45, 18, 16/35 D, 46; 188/1 D

[56] References Cited

U.S. PATENT DOCUMENTS 3,914,821 10/1975 Screen ................................. 16/35 R
4,110,866 9/1978 Ishii ..................................... 16/35 R Primary Examiner—Doris L. Troutman
Attorney, Agent, or Firm—McWilliams, Mann & Zummer

[57] ABSTRACT

A twin wheel caster brake device for casters of the type having two wheels mounted on a common axle, with each wheel having a series of inwardly directed circumferential teeth, or wedge-shaped ribs, disposed at the inner side of each wheel forming a series of slots between the adjacent ribs and each rib having a surface projection forming a constriction in each slot for retaining a braking, or locking pin, which is mounted, or formed on a brake pedal that acts as a lever to force the pin into a slot when it is desired to brake the caster.

6 Claims, 5 Drawing Figures

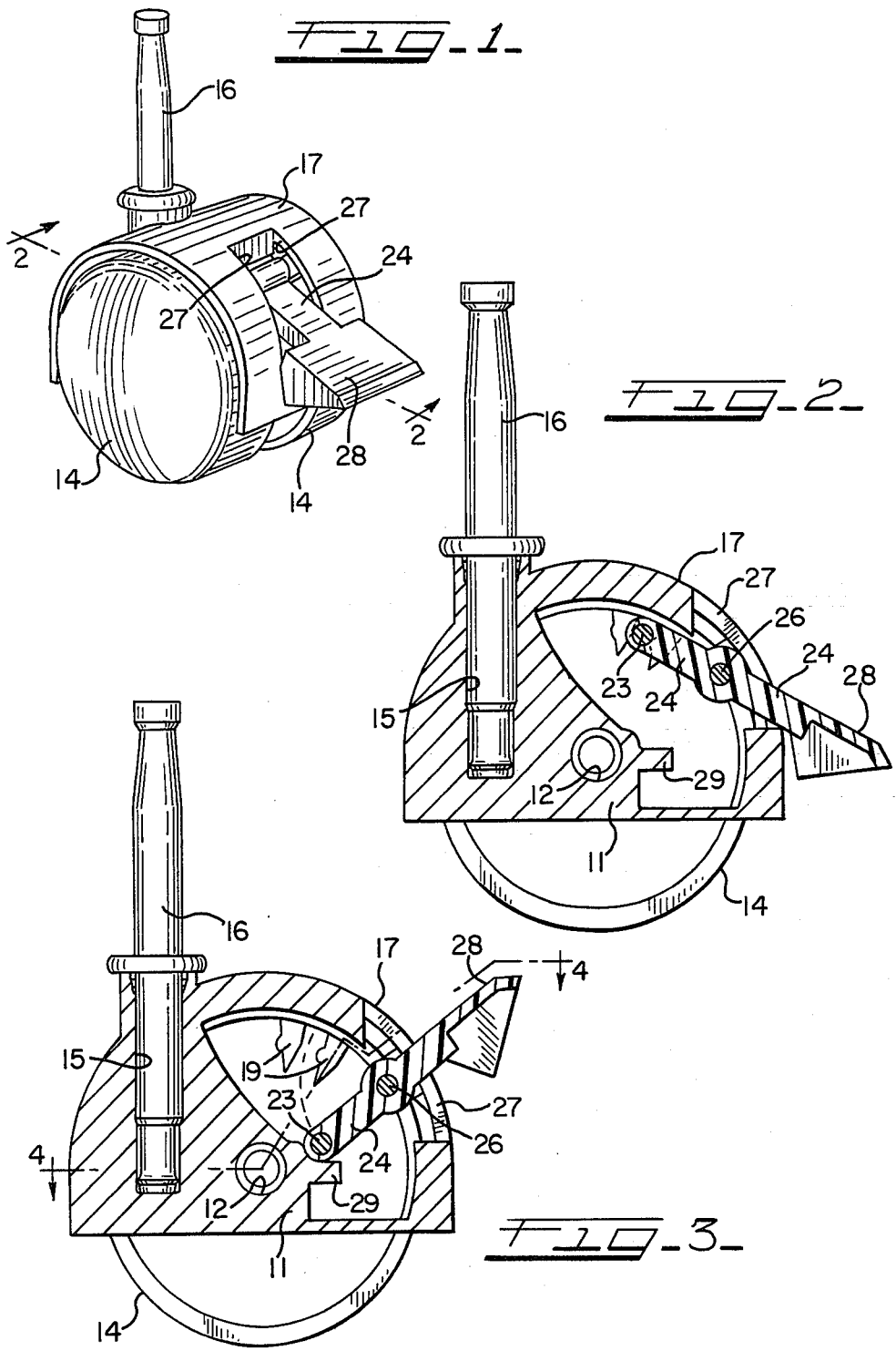

TWIN WHEEL CASTER BRAKE

BACKGROUND OF THE INVENTION

1. Field Of The Invention

This invention relates to casters and primarily casters of the twin wheel type having a pair of supporting wheels on a common axle designed to support articles, such as furniture, or the like, for ready movement about a home, office, or other location and is especially concerned with such casters having braking devices for preventing rotation of the wheels when an article is located as desired.

2. Description Of The Prior Art

Heretofore, brake arrangements have been provided for casters but these have usually been of a friction type retarding mechanism designed to restrain a caster wheel against rolling. U.S. Pat. No. 2,434,863 discloses such a brake device wherein a pivoted finger is adapted to be engaged between a side portion of the caster wheel and a side wall of a casing for the caster to provide a frictional engagement wedged between the parts to restrain the wheel from rotation. U.S. Pat. No. 3,881,216 reveals a somewhat different type of brake for a caster wheel in that the braking element engages the perimeter of the wheel to effect the braking action which is initiated by a treadle member. In addition, this treadle actuates a toothed pawl vertically to engage complemental teeth on the caster to lock the caster against any swivelling movements. U.S. Pat. No. 3,914,821 discloses a caster having cup-shaped rollers on a single axle with a brake shoe adapted to engage the inner circumferential surfaces of the rollers thus providing a frictional engagement to prevent rotation of the rollers.

A centrally actuated wheel locking mechanism for hospital bed casters utilizing electromagnet devices for effecting locking action is disclosed in U.S. Pat. No. 3,890,668 wherein a movable magnetic core is operatively connected to the wheel locking catch member at each wheel and is movable vertically to engage and disengage the locking devices. U.S. Pat. No. 4,110,866 uses a pair of wheels mounted at the ends of an axle with gear like bosses on the wheel hubs which are adapted to be engaged by a toothed member which is adapted to be pushed into locking engagement with the gear teeth on the hubs by means of a lock pin against the resistance of a compression spring thereby to lock the wheels against rotation. The caster of U.S. Pat. No. 4,143,442 also uses a pair of caster wheels on a single axle and utilizes a friction braking device to both brake the wheels and retain the wheels on the axle and it should be noted that this device automatically releases when the article on which it is mounted is loaded and applies the braking action when the article is without load.

The prior art does not reveal any caster braking arrangement wherein a lever actuated locking pin engages radially disposed circumferential slots at the inner sides of a commonly mounted pair of wheels with retention means in the individual slots to retain the locking pin operatively engaged.

SUMMARY OF THE INVENTION

This invention provides a positive type braking device for casters of the twin wheel type having a pair of wheels mounted on a common axle and wherein the wheels comprise generally cup-shaped rollers in opposed relation on the axle. Each such wheel is provided on the inner circumferential surface of the cup-shaped member with a plurality of equally spaced ribs extending radially and disposed entirely around the inner side of the cup-shaped surface at the inner periphery of the wheel.

These ribs are all of equal length and are specially contoured to provide a surface projection on at least one farce of each rib providing a restriction in the width of the slots whereby to retain a locking pin fully engaged in a selected slot. The locking pin is mounted on a lever pivotally supported in the caster housing with a pedal type actuating portion at one end extending beyond the housing and the locking pair at the opposite end of the lever normally resting on a brake stop adjacent the axle mounting hub in the housing.

The locking pin extends outwardly upon opposite sides of the lever and engages slots in opposing wheels simultaneously to prevent both wheels from rotating and the shape of the restriction in the slots acts to retain the pin fully engaged and prevents the locking pin from becoming disengaged until it is desired to release the wheels, at which time the brake pedal must be raised in order to disengage the locking pin from the slots.

The locking pin is caused to enter the slots by depressing the brake pedal, thus fulcruming the lever about its pivot and causing the brake pins to be pressed past the restrictions presented by the contoured projections of the slot surfaces into the fully engaged braking position in the innermost depth of the slots where they are restrained against escape by the obstacle presented by the projection.

Thus, the primary purpose of the invention is to provide a twin wheel caster having braking means adapted to engage both wheels and positively prevent their rotation by actuating a brake pedal disposed between the wheels. A principal object of the invention is the provision for braking a twin wheel caster by means of a brake lever having a brake pin engageable simultaneously and selectively into aligned slots in complemental wheels at opposite sides of the brake actuating lever device adapted to move the pin into the slots under externally applied pressure.

An important objective is realized by specially contoured slots for the brake pin formed about the inner periphery of each wheel and extending generally radially of the wheel for simple entry and exit of the locking pin under actuation by a pivoted lever operated by an external pedal. Specifically the caster provides a rest stop for the brake pin adjacent to the hub of the caster mounting the wheel axle where the brake pin normally reposes in the released condition of the brake and is movable away from this stop and into the wheel slots by actuation of the external brake pedal.

DESCRIPTION OF THE DRAWINGS

The foregoing and other and more specific purposes of the invention are realized in the twin wheel caster structure and brake arrangement illustrated in the accompanying drawings wherein FIG. 1 is a general perspective view of a twin wheel caster having a braking mechanism in accordance with this invention;

FIG. 2 is a longitudinal sectional view through the caster as indicated by the line 2—2 in FIG. 1, showing the brake mechanism in applied position;

FIG. 3 also is a longitudinal sectional view through the caster similar to FIG. 2 but illustrating the brake mechanism in released position;

DESCRIPTION OF PREFERRED EMBODIMENT

Figure 4:
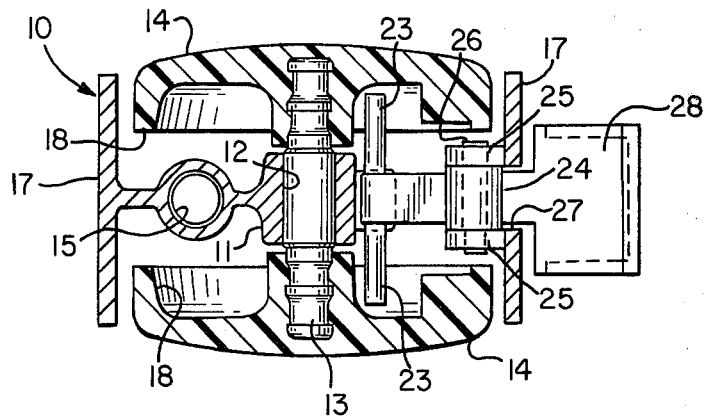
FIG. 4 is a horizontal sectional view through the caster taken on the line 4—4 of FIG. 3.

The caster as disclosed herein includes a body 10 having a central hub 11 containing a bearing 12 for an axle 13 that extends through the bearing and projects upon opposite sides of the bearing as best shown in FIG. 4. Identical wheels 14 are mounted upon respectively opposite ends of the axle with their cupped, or hollow, inner sides disposed in opposed relation facing inwardly of the caster and having the central body portion of the caster disposed between the wheels. The caster body 10 has a vertically disposed swivel socket 15 for a vertical mounting stem 16 by means of which the caster is secured to an article of furniture, or the like, for swivelling movements of the caster relative to the article. The caster includes a wheel cover 17 extending over both wheels and the swivel socket 15 extends upwardly through this cover and is disposed between the wheels 14 to one side of the hub 11 and axle 13, as indicated in FIGS. 2 and 3.

Figure 5:
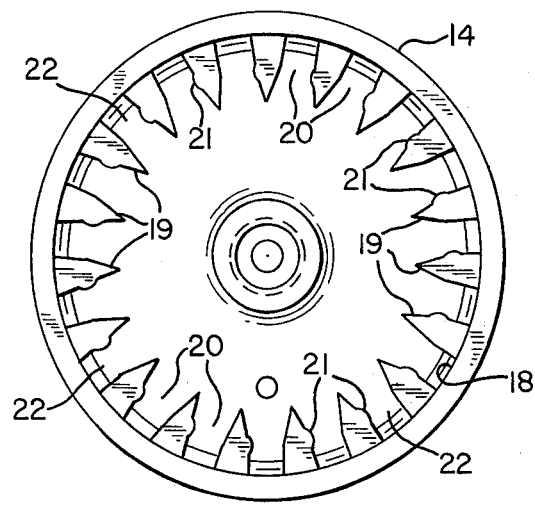
FIG. 5 is a detail inside elevational view of a caster wheel illustrating the details of the radially disposed locking slots disposed around the inner periphery of the wheel and revealing the contours of the restriction surface formed in the respective slots.

As best shown in FIG. 5, each of the roller wheels 14 includes an inwardly disposed peripheral rim 18 and the inside peripheral surface of this rim is formed with a continuous series of inwardly, or radially directed ribs 19 integral with the rim and merging into the outer side wall, or web of the wheel 14. The ribs 19 form slots 20 at regularly spaced intervals continuously around the inner periphery of the rim 18 and as described with reference to the ribs 19 these slots are radially disposed and are open toward the center of the wheel. As best shown in FIG. 5, the ribs 19 taper from opposite sides toward the inner extremities thereof extending toward the hub 11 and each terminates in an inner knife edge so that each rib takes the general form of a wedge whereby the slots 20 each have a flared entrance area spaced inwardly from the rim 18. The ribs 19 are each formed with a protuberance on one tapering side thereof in the form of a rounded projection 21 that extends toward the next adjacent rib and thus forms a constriction in each slot 20 and defining a restricted retention area 22 in the innermost reaches of each of the slots, which is the area inwardly of the slot beyond the projection 21 adjacent to the wheel rim 18.

The rim slots 20 are designed to cooperate with a locking, or brake pin 23, as best indicated in FIGS. 2 and 3 and which, as shown in FIG. 4 extends into the hollow cup shaped areas of both of the opposite roller wheels 14. The brake pin 23 is mounted at the inner end of a brake lever 24 that is pivotally mounted intermediate its ends between a pair of lugs 25, as by a pivot pin 26. The lugs 25 are secured to or formed integrally with the wheel cover 17 on the inner side thereof and the brake lever 24 extends through an opening 27 through the wheel cover, to enable the brake lever to be actuated vertically about the pivot 26. The brake lever at its outer end disposed outwardly of the wheel cover 17, is provided with a brake pedal 28 by means of which the brake lever and the brake pin are actuated.

This brake pedal is designed to be actuated by an operator's foot whereby with the pedal in the released position shown in FIG. 3, it is necessary merely to step on the pedal 28 and press downwardly to fulcrum the brake lever about the pivot pin 26 and cause the brake pin end of the lever to be raised on an arc about the pivot point. In the locked position of the lever 24 with the pin 23 in the brake position, as shown in FIG. 2, it is necessary merely to engage a toe under the brake pedal 28 and raise it to swing the brake pin 23 downwardly about the same arc as in raising it and thereby release the braking action from both wheels 14 and leave them free to roll.

In the released position of FIG. 3, the inner end of the brake lever 24 rests on a bracket 29 formed integrally with the hub 11 of the caster body and this acts as a stop, limiting downward movement of the brake lever inner end and the brake pin 23 and serves to maintain the brake pedal 28 in the FIG. 3 position ready to be actuated downwardly to lock the caster wheels.

When the brake pedal 28 is moved downwardly, as by stepping on it, the brake lever 24 fulcrums about the pivot pin 26 and the inner end of the lever moves upwardly in an arc about the pivot and the brake pin 23 of course, moves upwardly in this same arc with the brake lever. The pin 23 extends into the hollow cup shaped interiors of the opposite roller wheels 14 so that when the brake pedal is fully actuated, the opposite ends of the pin 23, guided by the wedge shaped contours of the ribs 19, enters the slots 20 in the respective wheels. If the brake pedal is actuated to its fully depressed position, as shown in FIG. 2, the brake pins will enter the retention areas 22 beyond the protuberances 21 so that the brake pin will be retained in this position until the brake pedal 28 is lifted by engaging a toe under the pedal and moving it upwardly.

In moving the brake pins past the rounded projections 21 some pressure must be exerted, sufficient to force the brake pins through the constrictions created by the narrowed spaces between the projections 21 and the next adjacent ribs 19 and such pressure is easily applied by use of the foot on the brake pedal 28 whereby an operator's weight is readily brought to bear in forcing the brake pins through the constrictions into the retention areas 22 in the respective wheels 14. Conversely, substantially the same degree of force must be used in raising the pedal 28 with the toe to retract the brake pins and release the braking action so that the wheels are then free to roll. The brake pins must be forced through the constriction formed by the surface 21 in an opposite direction from the operation of applying the brake. The wedge shaped contours of the ribs 19 facilitate the operation of the brake pins entering and exiting the slots 20 and especially the entering movements of the pins 23 in that the knife edges of the ribs at the inner extremities thereof preclude any possibility of the brake pins coming into engagement with a flat surface that might prevent the pins from entering the slots 20.

CONCLUSION

The invention provides a caster brake for the rollers of twin wheel casters where the pair of wheels are mounted in opposed relation on a common axle and the wheels each have an inwardly directed peripheral rim forming a hollow inner side. A brake lever is pivotally mounted between the wheels and a brake pin at the inner end of the lever projects upon opposite sides of the lever into the hollow inner side of the respective wheels. The brake lever extends through a slotted wheel cover where it is provided with a brake pedal at its outer end for actuating the brake. The peripheral rim of each wheel is provided with a series of internal ribs forming slots extending radially and open toward the axis of the wheel so that when the brake pin is swung upwardly by the pivoting action of the brake lever the opposite ends of the brake pin will be caused to enter the open slots in each wheel and thereby effectively lock the wheels against rotation.

What is claimed is:

1. A twin wheel caster brake arrangement including a caster having a pair of wheels mounted on a common axle at opposite sides of a central body, said body having a central hub and a wheel cover overlying said wheels, a brake lever between the wheels pivotally mounted under the wheel cover and an outer end of the lever extending through the wheel cover, and a brake pin at the inner end of the lever extending into locking engagement with the respective wheels when said outer end is fulcrumed about said pivotal mounting.

2. A twin wheel caster brake as set forth in claim 1 wherein said wheels have peripheral rims creating hollow areas at the inner sides of the wheels and said brake pin extends into said hollow areas, a plurality of radially disposed ribs extending inwardly from said rims forming inwardly open slots therebetween, said brake pin being entered in aligned slots in the opposed wheels when the brake lever is fulcrumed about the pivotal mounting.

3. A twin wheel caster brake as set forth in claim 2 wherein said ribs have knife edge inner ends and are wedge shaped to guide said brake pins entering the slots.

4. A twin wheel caster brake as set forth in claim 3 wherein said slots each have a constriction formed by a rounded projection on one side of each wedge shaped rib, and a restricted retention area for the brake pin beyond said constriction when the brake pin is moved past the constriction by said lever.

5. A twin wheel caster brake as set forth in claim 4 wherein said central hub is provided with a rest stop for the inner end of the brake lever when the brake pins are disengaged from said slots by the pivoting action of the brake lever.

6. A twin wheel caster brake as set forth in claim 5 wherein said wheel cover is slotted for the brake lever passing therethrough, and a brake pedal on the outer end of the brake lever.

* * * * *